United States Patent
Chen

(10) Patent No.: US 9,786,311 B2
(45) Date of Patent: Oct. 10, 2017

(54) NEAR-FIELD TRANSDUCER WITH TAPERED PEG

(71) Applicant: Seagate Technology LLC, Cupertino, CA (US)

(72) Inventor: Weibin Chen, Bloomington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/221,991

(22) Filed: Jul. 28, 2016

(65) Prior Publication Data

US 2017/0032811 A1    Feb. 2, 2017

Related U.S. Application Data

(60) Provisional application No. 62/198,773, filed on Jul. 30, 2015.

(51) Int. Cl.
| | |
|---|---|
| *G11B 11/00* | (2006.01) |
| *G11B 5/60* | (2006.01) |
| *G11B 5/00* | (2006.01) |
| *G11B 11/105* | (2006.01) |

(52) U.S. Cl.
CPC .......... *G11B 5/6082* (2013.01); *G11B 5/6088* (2013.01); *G11B 11/1051* (2013.01); *G11B 11/10506* (2013.01); *G11B 11/10534* (2013.01); *G11B 11/10536* (2013.01); *G11B 11/10539* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,855,937 B2 | 12/2010 | Shimazawa et al. | |
| 8,320,219 B1 * | 11/2012 | Wolf | G11B 5/314 369/13.33 |
| 8,472,288 B1 * | 6/2013 | Wolf | G11B 5/314 369/13.33 |
| 8,971,160 B1 * | 3/2015 | Yuan | G11B 5/40 369/13.13 |
| 9,449,625 B1 * | 9/2016 | Vossough | G11B 5/3133 369/13.33 |
| 2005/0289576 A1 * | 12/2005 | Challener | B82Y 10/00 369/13.33 |
| 2012/0045662 A1 * | 2/2012 | Zou | G11B 5/3133 369/13.33 |
| 2014/0251948 A1 | 9/2014 | Zhao et al. | |
| 2014/0254336 A1 * | 9/2014 | Jandric | G02B 6/1226 369/13.33 |
| 2015/0043315 A1 * | 2/2015 | Chen | G11B 5/314 369/13.33 |

(Continued)

*Primary Examiner* — Tan X Dinh
(74) *Attorney, Agent, or Firm* — Hollingsworth Davis, LLC

(57) ABSTRACT

An apparatus includes a waveguide that delivers energy from an energy source, a write pole located proximate the waveguide at a media-facing surface, and a near-field transducer located proximate the write pole in a down track direction. The near-field transducer includes an enlarged portion and a peg extending from the enlarged portion towards the media-facing surface. The peg comprises a taper facing away from the write pole, and the taper causes a reduced down track dimension of the peg near the media-facing surface.

19 Claims, 12 Drawing Sheets

(56) References Cited

U.S. PATENT DOCUMENTS

| | | | |
|---|---|---|---|
| 2015/0117169 A1 | 4/2015 | Kautzky et al. | |
| 2015/0340050 A1* | 11/2015 | Wessel | G02B 6/1226 369/13.33 |
| 2016/0133286 A1* | 5/2016 | Lee | G11B 5/4866 369/13.33 |
| 2016/0133291 A1* | 5/2016 | Chen | G11B 5/314 369/13.33 |
| 2016/0351209 A1* | 12/2016 | Chen | G11B 5/314 369/13.33 |

* cited by examiner

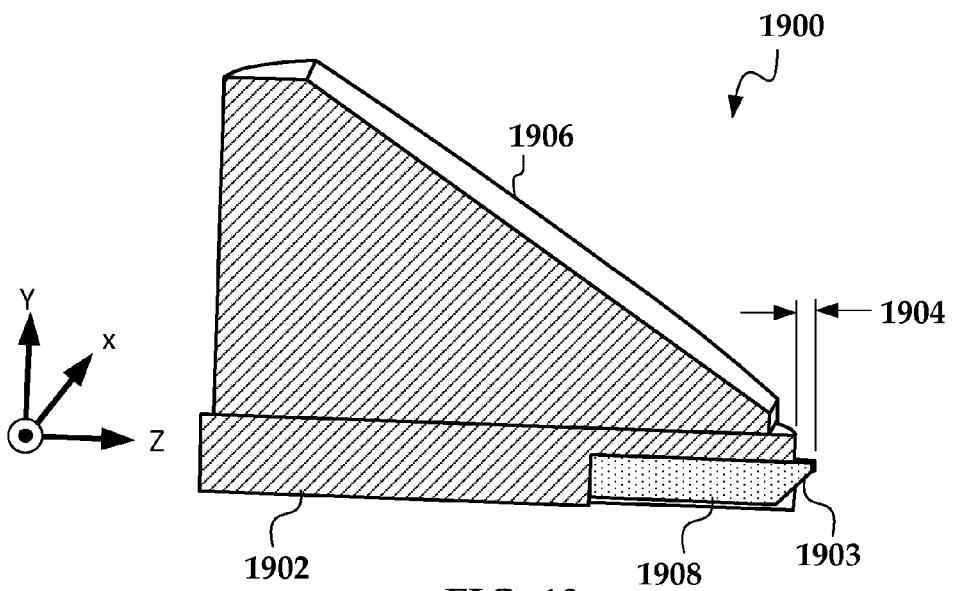
FIG. 19
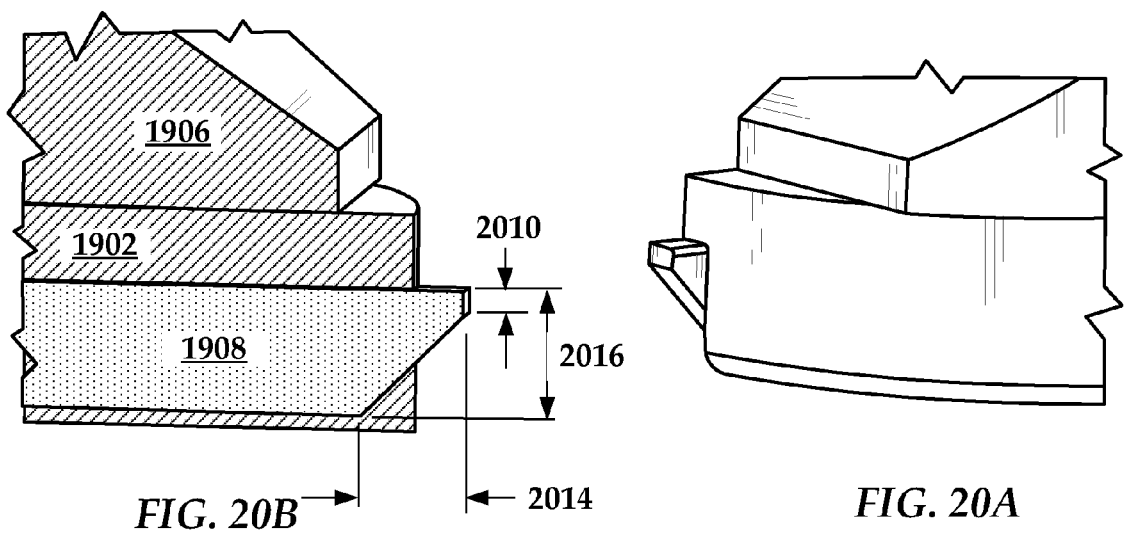
FIG. 20B
FIG. 20A

|  | Track width (nm) | wTG (K/nm) | wMT (K/mW) | Peg T (K) |
| --- | --- | --- | --- | --- |
| PW25 with taper | 32 nm | 14.3 K/nm | 155.6 K/mW | 31.0 K |
| Compared to 5W PW25 | 32 nm | +25.5% | +29.0% | -16.7 K |
| PW35 with taper | 39 nm | 11.5 K/nm | 145.1 K/mW | 28.8 K |
| Compared to 5W PW35 | 39 nm | +23.0% | +21.7% | -14.1 K |
| PW45 with taper | 50 nm | 10.6 K/nm | 127.7 K/mW | 30.8 K |
| Compared to 5W PW45 | 50 nm | +23.9% | +16.0% | -10.4 K |

FIG. 29

NEAR-FIELD TRANSDUCER WITH TAPERED PEG

RELATED PATENT DOCUMENTS

This application claims the benefit of Provisional Patent Application Ser. No. 62/198,773 filed on Jul. 30, 2015, to which priority is claimed pursuant to 35 U.S.C. §119(e), and which is incorporated herein by reference in its entirety.

SUMMARY

The present disclosure is related to a near-field transducer with a tapered peg. In one embodiment an apparatus comprises a waveguide that delivers energy from an energy source, a write pole located proximate the waveguide at a media-facing surface, and a near-field transducer located proximate the write pole in a down track direction. The near-field transducer comprises an enlarged portion and a peg extending from the enlarged portion towards the media-facing surface. The peg comprises a taper facing away from the write pole, and the taper causes a reduced down track dimension of the peg near the media-facing surface.

Another embodiment is directed to an apparatus comprising a waveguide that delivers energy from an energy source, a write pole located proximate the waveguide at a media-facing surface, and a near-field transducer located proximate the write pole in a down track direction. The near-field transducer comprises an enlarged portion and a peg extending from the enlarged portion towards the media-facing surface. The peg and the enlarged portion comprise a taper facing away from the write pole, and the taper causes a reduced down track dimension of the peg near the media-facing surface.

Further embodiments are directed to an apparatus comprising a waveguide that delivers energy from an energy source, a write pole located proximate the waveguide at a media-facing surface, and a near-field transducer located proximate the write pole in a down track direction. The near-field transducer comprises an enlarged portion comprising a first material and a peg comprising a second material. The peg includes a peg portion extending from the enlarged portion towards the media-facing surface where the peg portion comprises a taper facing away from the write pole. The taper causes a reduced down track dimension of the peg near the media-facing surface.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

FIG. 19 is a cross-sectional view of a two-piece NFT design according to an example embodiment;

FIG. 20A is a perspective view of a two-piece NFT design according to an example embodiment;

FIG. 20B is a close-up view of FIG. 19 according to an example embodiment;

FIG. 29 is a chart showing the effect of varying the peg width;

DETAILED DESCRIPTION

Figure 1:
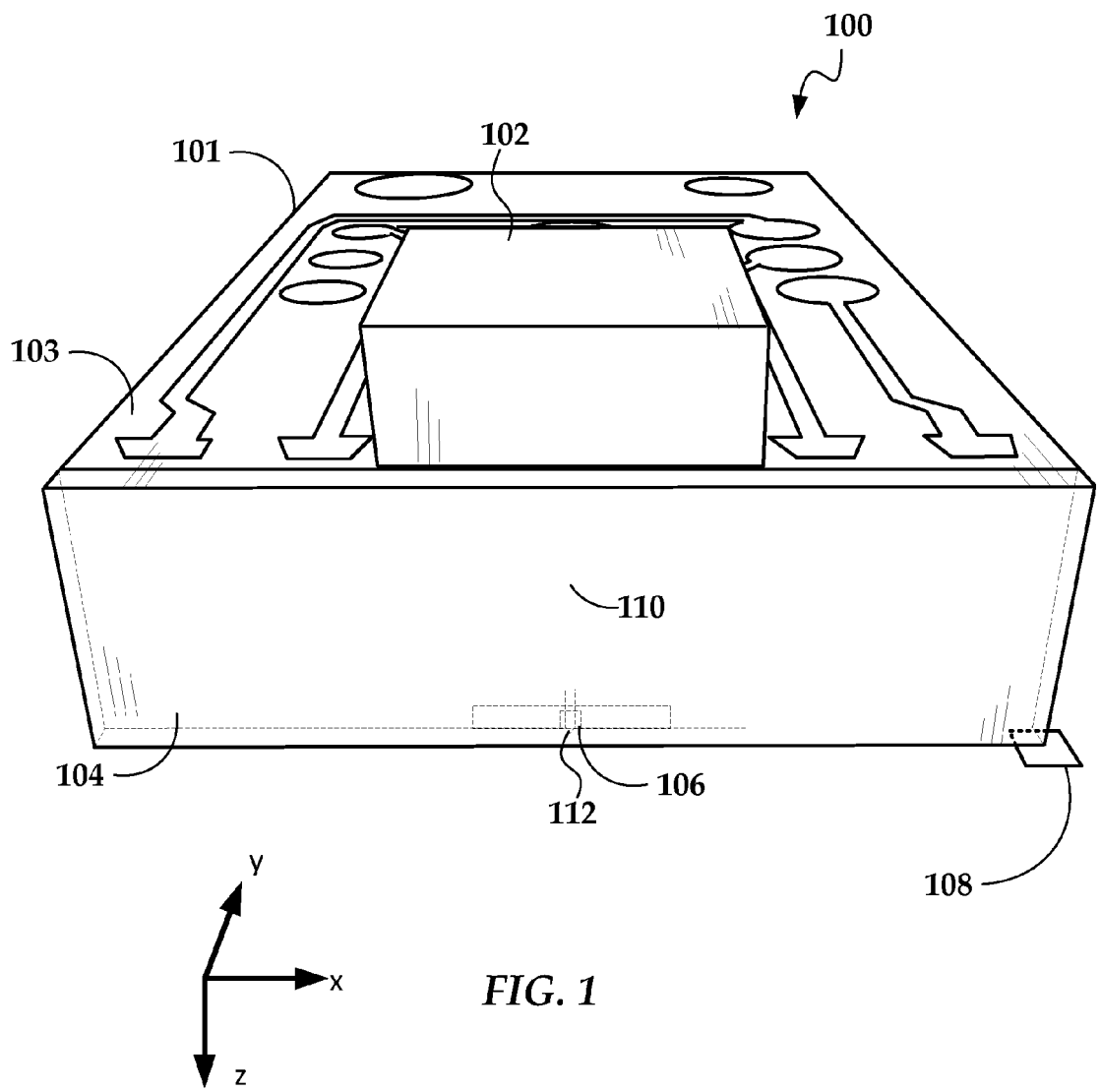
FIG. 1 is a perspective view of a slider assembly according to an example embodiment.

The present disclosure is generally related to an apparatus (e.g., a write head) having a waveguide that delivers light from an energy source (e.g., laser diode) to a near-field transducer (NFT). An NFT is used in data recording referred to as heat-assisted magnetic recording (HAMR), also referred to as energy-assisted magnetic recording (EAMR), thermally-assisted magnetic recording (TAMR), and thermally-assisted recording (TAR). The NFT may also be referred to as a plasmonic transducer, plasmonic antenna, near-field antenna, nano-disk, nano-patch, nano-rod, etc. Light coupled to the NFT generates a surface plasmon field. The surface plasmons are directed out of a surface of the write head onto a magnetic recording medium. This creates a hotspot on the recording medium lowering its magnetic coercivity and enabling a local magnetic field generated by a write pole to write data to the hotspot.

The heated (thermal) spot is closely aligned to the head field at the writing point to improve written track quality. However, when the size of the hotspot extends to multiple tracks on the media, writing errors can result. Confining the size of the hotspot, e.g., to a single track, further improves written track quality. In addition, confining the size of the hotspot reduces the thermal background of the hotspot.

In embodiments described below, a NFT includes features to increase thermal gradient and confine the hotspot. The NFT may include, among other things, an enlarged portion and a peg extending from the enlarged portion towards a media-facing surface. The NFT may also include an optional heatsink portion proximate the enlarged portion. The peg has a taper facing away from a write pole. The taper causes a reduced down track dimension of the peg near the media-facing surface. The taper of the peg in the down track direction provides for a reduction of the optical field between the write pole and the peg that produces background heating of the medium, which undesirably reduces the thermal gradient of the peg field. A reduction of the optical field in the NFT-to-pole spacing (NPS) region (and therefore an increase in thermal gradient in the peg region) can be achieved by tapering the peg to provide a reduced down track peg dimension near the media-facing surface according to various disclosed embodiments.

According to various embodiments, the taper of the NFT is sized to facilitate an increase in thermal gradient (e.g., wTG or down track thermal gradient) relative to the same NFT lacking the tapered region. In other embodiments, the taper and corresponding dimensions of the peg are sized to facilitate an increase in thermal gradient without any or an appreciable increase in peg temperature (e.g., no more than about 3, 4 or 5° K) relative to the same NFT lacking the taper. In further embodiments, the taper of the NFT and the dimensions of the peg are sized to facilitate an increase in thermal gradient without an appreciable increase in peg temperature or reduction in efficiency relative to the same NFT lacking the taper. In some embodiments, the taper of the NFT is sized to facilitate an increase in thermal gradient without an appreciable increase in adjacent track erasure (ATE) relative to the same NFT lacking the taper. Embodiments of an NFT having a taper of the peg facing away from a write pole and causing a reduced down track dimension of the peg near the media-facing surface as described herein provide for increased performance (e.g., a more confined thermal spot and gradient on the medium and reduced thermal background) while maintaining good reliability (e.g., no appreciable penalty in terms of peg temperature, efficiency, or ATE).

While these features may be used in any nanoscale energy delivery system, the features are discussed below in the context of a HAMR write head. A HAMR read/write element, sometimes referred to as a slider or read/write head, can include magnetic read and write transducers similar to those on current hard drives. For example, data may be read by a magnetoresistive sensor that detects magnetic fluctuations of a magnetic media as it moves underneath the sensor. Data may be written to the magnetic media by a write pole that is magnetically coupled to a write coil. The write pole changes magnetic orientation in regions of the media as it moves underneath the write pole. A HAMR slider also includes or is coupled to a source of energy, such as a laser diode, for heating the medium while it is being written to by the write pole. An optical delivery path, such as an optical waveguide, is integrated into the HAMR slider to deliver the optical energy to the NFT.

In reference to FIG. 1, a perspective view shows a HAMR write head 100 according to an example embodiment. The write head 100 includes a laser diode 102 located on input surface 103 of a slider body 101. In this example, the input surface 103 is a top surface, which is located opposite a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers energy (e.g., light of wavelength just above the visible range) to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations.

The near-field transducer 112 may be made of noble metals (Au, Ag, Cu, Al, Rh, Ir, Pt,), conducting oxides (ZrN, AlZnO) and/or alkali-noble intermetallics. The near-field transducer interacts with the light propagating in the waveguide efficiently through surface-plasmon excitation at the interface between the metal and dielectrics. This interaction condenses the electromagnetic field into a tiny spot, which tunnels into a recording medium, raising the media temperature locally by absorption.

The laser diode 102 in this example may be configured as either an edge-emitting laser or surface-emitting laser. Generally, the edge-emitting laser emits light from one side of the laser and a surface emitting laser emits light in a direction perpendicular to a surface of the laser body. An edge-emitting laser may be mounted on the top surface 103 of the slider body 101 (e.g., in a pocket or cavity) such that the light is emitted in a direction toward the media-facing surface. A mirror or the like may be used to direct the light towards the waveguide system 110. In other embodiments, an edge-emitting laser may be mounted on a submount to direct the light towards the waveguide system 110 without requiring a mirror.

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the write head 100, and coupled to the slider by way of optic fiber and/or waveguide. An input surface of the slider body 101 may include a grating or other coupling feature to receive light from the laser via the optic fiber and/or waveguide.

Figure 2:
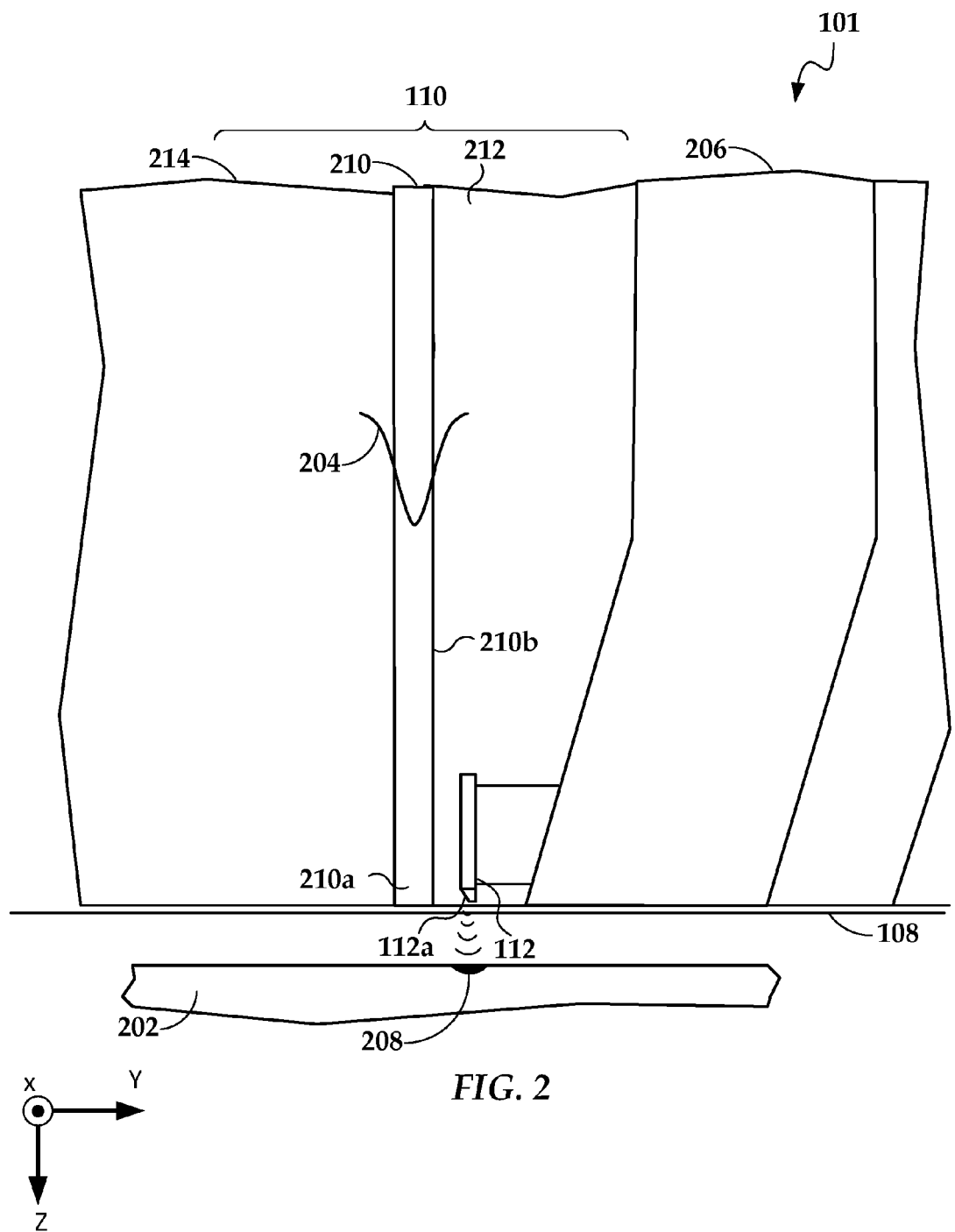
FIG. 2 is a cross-sectional view illustrating details of a light path according to an example embodiment.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hotspot 208 on the recording medium 202. A magnetic write pole 206 causes changes in magnetic flux near the media-facing surface 108 in response to an applied current. Flux from the write pole 206 changes a magnetic orientation of the hotspot 208 as it moves past the write pole 206 in the down track direction (y-direction). The slider body 101 moves over the recording medium in a cross-track direction (x-direction).

The waveguide system 110 includes a core layer 210 surrounded by cladding layers 212, 214. The core layer 210 and cladding layers 212, 214 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, SiC, GaP, Si, etc. Generally, the dielectric materials are selected so that the refractive index of the core layer 210 is higher than refractive indices of the cladding layers 212, 214. This arrangement of materials facilitates efficient propagation of light through the waveguide system 110.

A first end of the core 210 (not shown) extends along the light propagation direction (z-direction) where it is directly or indirectly coupled to a light/energy source. For example, a laser diode may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy coupled into the first end of the waveguide core 210 propagates to a second end 210a that is proximate the near-field transducer 112. In this configuration, the near-field transducer 112 is located on a first side 210b of the waveguide core 210.

The NFT 112 includes a tapered portion 112a. The tapered portion 112a faces away from the write pole 206 and causes a reduced down track dimension of the NFT (e.g., a peg portion of the NFT) near the media-facing surface 108. The reduced down track dimension can be referred to as a thickness of the NFT, or thickness of a peg portion of an NFT, at the media-facing surface 108. Thus, the thickness refers to the dimension of the peg portion along the media-facing surface 108 between the write pole 206 and the core layer 210. The tapered portion 112a may be applied to a variety of NFT designs including NFTs having a cohesive, single piece body and multiple piece bodies (e.g., a peg portion formed separately and connected with an enlarged portion of an NFT). Examples of these respective NFT designs including a tapered NFT portion are discussed further below.

Figure 3:
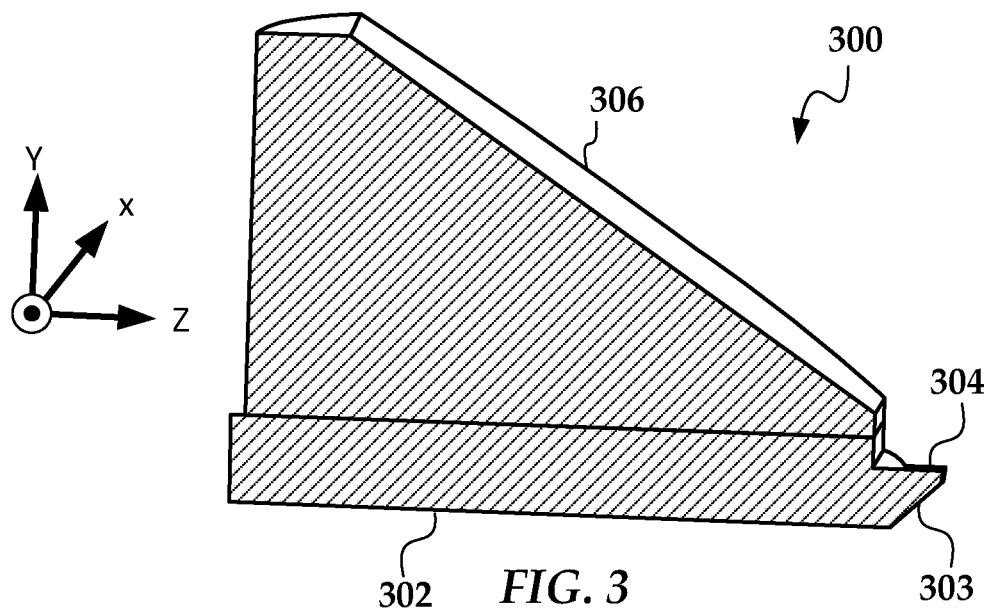
FIG. 3 is a cross-sectional view of a single piece NFT NTS design according to an example embodiment.

FIG. 3 is a cross-sectional view of a single piece NFT design. A single piece NFT design comprises a unitary body including both an enlarged portion and a peg portion of the NFT and results from deposition of the same materials to form both the enlarged and peg portions of the NFT. The illustrated portion of NFT 300 includes an enlarged region 302, a peg region 304 and a heatsink portion 306. The peg region 304 extends from the enlarged region 302 toward the media-facing surface 108 (in the light-propagating, or z, direction). The peg region 304 terminates at a distal end at or proximate the air bearing surface 108. The NFT 300 is shown to include a tapered portion 303 facing away from the heatsink portion 306 and the write pole, not shown, and that reduces the peg dimension in the down track direction. Since the NFT comprises a unitary body, the thickness of the peg absent the tapered portion would be equal to the thickness of the enlarged region 302 at the media-facing surface.

While the various embodiments described herein are applicable to a variety of NFT designs, including stadium-style (NTS) and lollipop-style (NTL) near-field transducer designs, FIG. 3 illustrates an NFT 300 having an NTS design. The heatsink portion 306 has a sloped planar upper surface and a planar lower surface. The enlarged region 302 is in contact with the heatsink portion 306. The heatsink portion 306 and the enlarged region 302 each have a first end, both of which terminate proximate the media-facing surface 108 of the slider on which the NFT 300 is formed. The peg region 304 extends from the lower portion of the first end of the enlarged region 302. As shown in FIG. 3, the first end for each of the heatsink portion 306 and the enlarged region 302 is recessed the same distance from the distal end of peg region 304, e.g., the first ends are co-planar. The taper 303 is sized to facilitate a reduction, or confinement, of the thermal spot, thereby reducing thermal background and increasing thermal gradient, by about 25%, when compared to an equivalent NFT that lacks the taper 303.

Figure 4A:
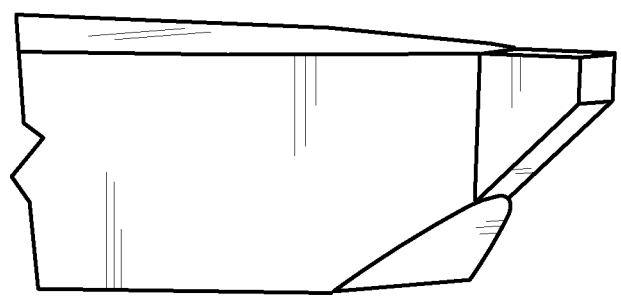
FIG. 4A is a perspective view of a single piece NFT design according to an example embodiment.
Figure 4B:
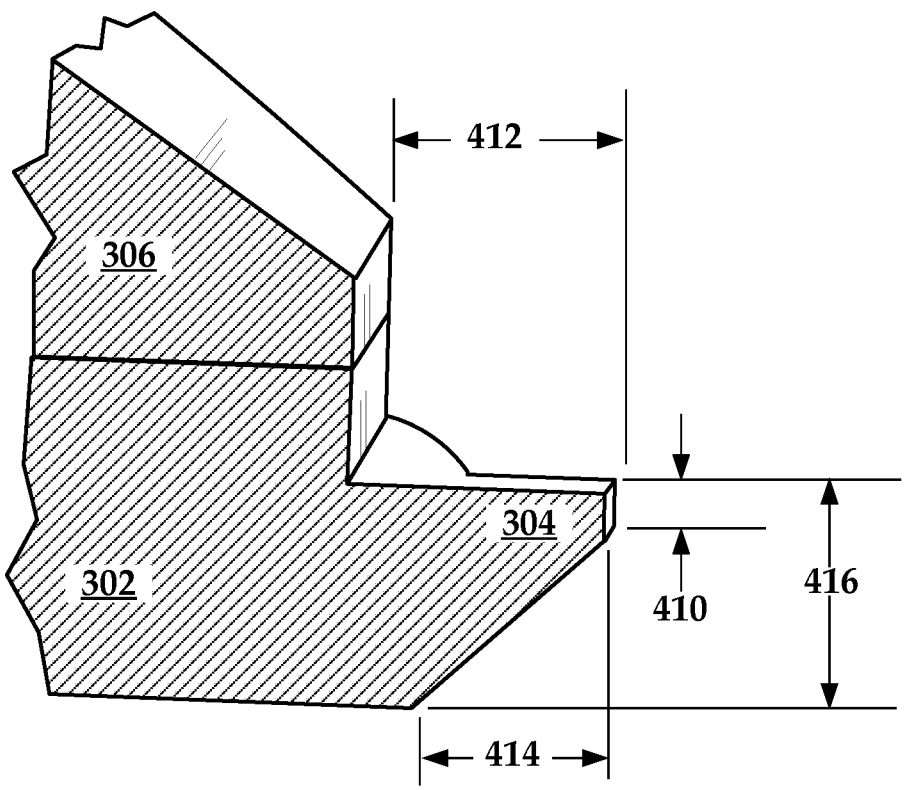
FIG. 4B is a close-up view of FIG. 3 according to an example embodiment.
Figure 4C:
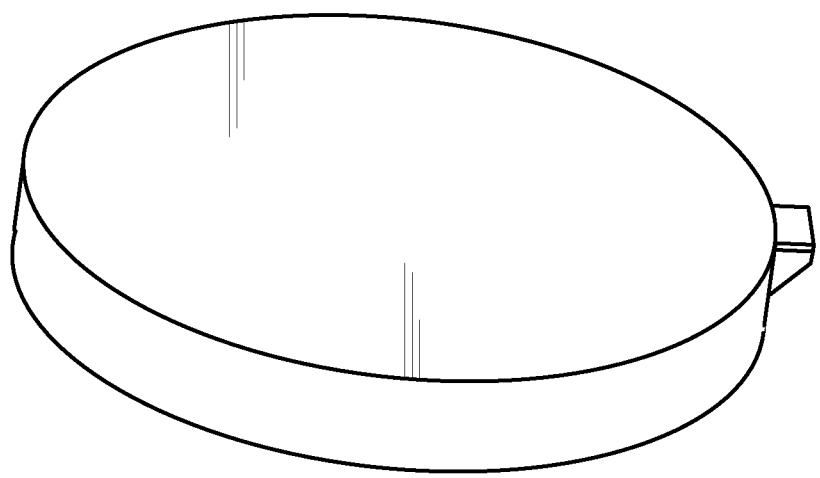
FIG. 4C is a perspective view of a NFT NTL design according to an example embodiment.

The tapered portion 303 is further illustrated in the perspective view of FIG. 4A showing only the enlarged region and peg of an NFT. For the single piece NFT design (either an NTS or an NTL style), the tapered portion 303 can include tapering of both the enlarged portion and the peg region 304. An example of a NTL style design is shown in FIG. 4C. FIG. 4B illustrates various dimensions that can be varied when including a tapered portion for various described embodiments. The peg thickness at the air-bearing surface of the slider (PTA) is delineated as dimension 410. PTA is measured along the media-facing surface in the down track direction. The distance the NFT (e.g., enlarged region and/or heatsink portion) is recessed from the distal end of the peg region 304 (TPH) is shown as dimension 412. TPH is measured in the light propagating direction and is the same as the amount of recession for the enlarged portion of the NFT 302 in FIG. 4B. The taper length, or bottom taper length (BTL), is shown as dimension 414 and is also measured in the light propagating direction. One or more of the PTA 410, BTL 414 and the peg thickness absent a taper 416 can be varied to adjust the taper angle. Each of these dimensions for a single piece NFT design can also be varied to modify NFT performance factors.

Figure 5:
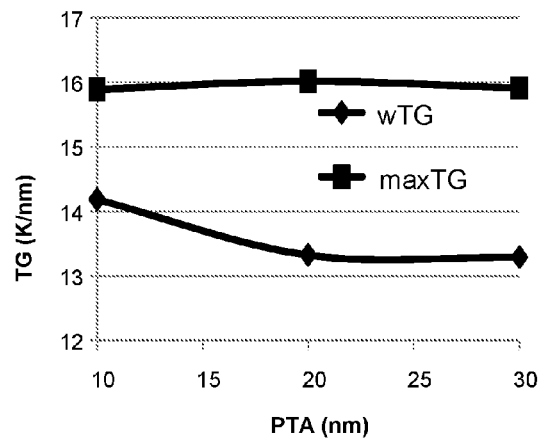
FIG. 5 is a graph showing thermal gradient as a function of peg thickness at the air-bearing surface of a slider according to example embodiments.
Figure 6:
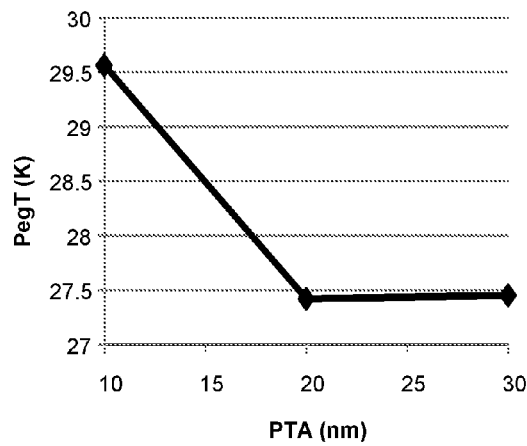
FIG. 6 is a graph showing peg temperature as a function of peg thickness at the air-bearing surface of a slider according to example embodiments.
Figure 7:
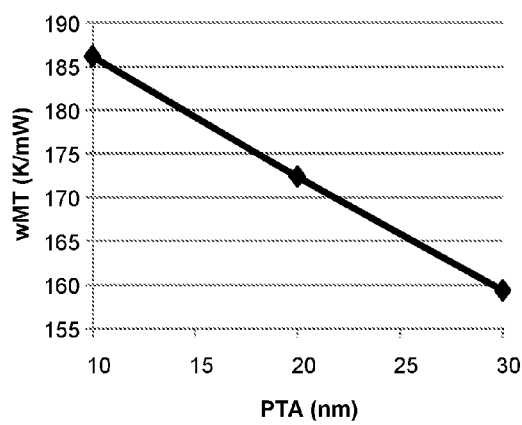
FIG. 7 is a graph showing efficiency as a function of peg thickness at the air-bearing surface of a slider according to example embodiments.
Figure 8:
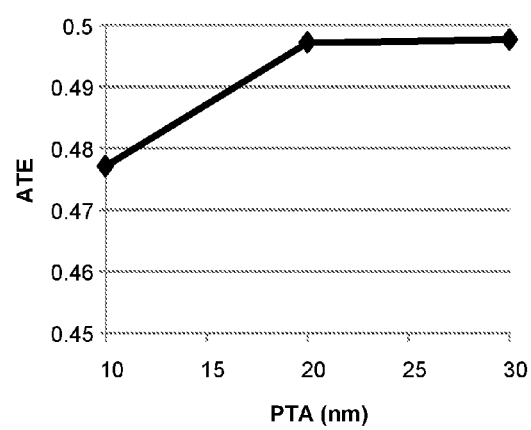
FIG. 8 is a graph showing adjacent track erasure as a function of peg thickness at the air-bearing surface of a slider according to example embodiments.

FIGS. 5-8 are graphs illustrating different NFT performance factors based on thickness of the peg at the air-bearing surface of the slider in accordance with various embodiments. FIG. 5 shows a graph of thermal gradient, including both maximum thermal gradient (maxTG) and thermal gradient in the down track direction (wTG), as a function of peg thickness at the ABS. FIG. 6 is a graph showing peg temperature as a function of peg thickness at the ABS. FIG. 7 is a graph showing peg efficiency (e.g., temperature rise per incident laser power) as a function of peg thickness at the ABS, and FIG. 8 is a graph of adjacent track erasure (ATE) as a function of peg thickness at the ABS. For each of FIGS. 5-8, the peg thickness at the ABS was scanned at 10 nm, 20 nm, and 30 nm. The graphs of FIGS. 5-8 indicate that smaller peg thicknesses at the ABS, e.g., 10 nm, yield higher thermal gradients and efficiency with lower adjacent track erasure. For example, the down track thermal gradient for a 10 nm thickness at the ABS can reach 14 K/nm while the maximum thermal gradient for each of the scanned thicknesses at the ABS is almost flat at 16 K/nm.

Figure 9:
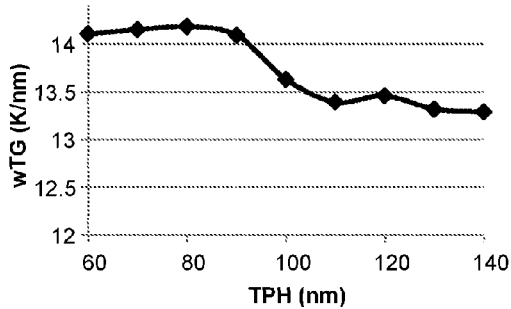
FIG. 9 is a graph showing down track thermal gradient as a function of TPH according to example embodiments.
Figure 10:
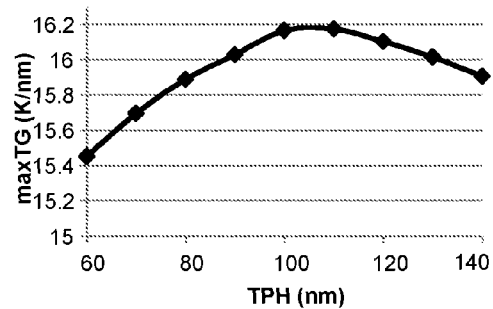
FIG. 10 is a graph showing maximum thermal gradient as a function of TPH according to example embodiments.
Figure 11:
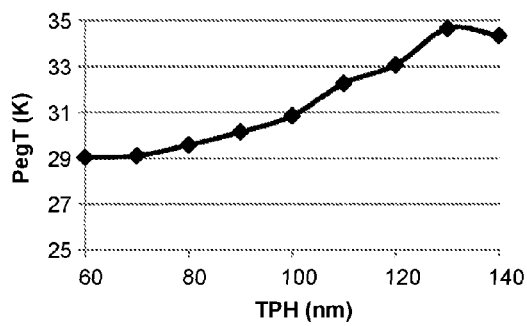
FIG. 11 is a graph showing peg temperature as a function of TPH according to example embodiments.
Figure 12:
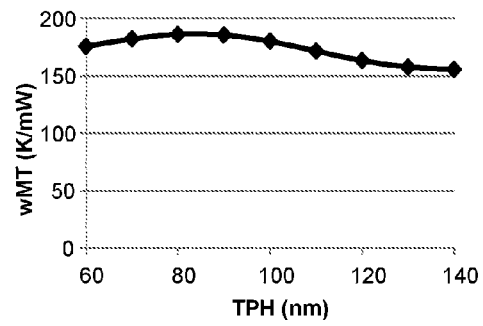
FIG. 12 is a graph showing efficiency as a function of TPH according to example embodiments.
Figure 13:
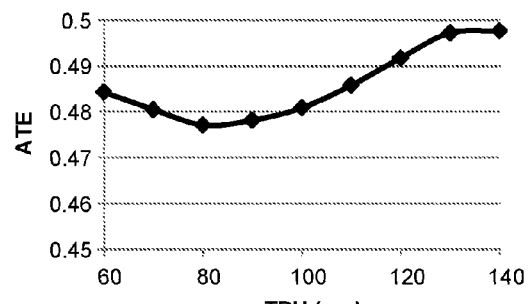
FIG. 13 is a graph showing adjacent track erasure as a function of TPH according to example embodiments.

FIGS. 9-13 are graphs illustrating different NFT performance factors based on TPH in accordance with various embodiments, FIG. 9 shows a graph of down track thermal gradient as a function of TPH, and FIG. 10 shows a graph of maximum thermal gradient as a function of TPH. FIG. 11 is a graph showing peg temperature as a function of TPH. FIG. 12 is a graph showing peg efficiency as a function of TPH, and FIG. 13 is a graph of ATE as a function of TPH. For each of FIGS. 9-13, the TPH was scanned through a range of 60 nm to about 140 nm, while the PTA was 10 nm and the BTL was 40 nm. Similar to FIG. 4B, TPH was equal to the amount of recession for a top disk portion of the NFT. The graphs of FIGS. 9-13 indicate that good or optimal performance, as shown by down track thermal gradient, peg temperature, and efficiency, can be achieved by a TPH of 80 nm under ADC conditions. However, under drive conditions involving larger head to media spacing, good or optimal performance can be achieved with a TPH of 120 nm. The data also shows that good performance can be achieved with a TPH ranging from about 50-100 nm for ADC conditions and ranging from about 100-160 nm for drive conditions.

Figure 14:
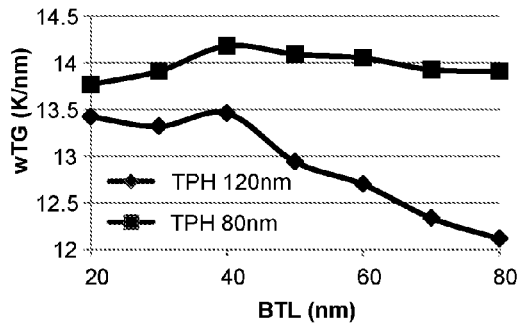
FIG. 14 is a graph showing down track thermal gradient as a function of BTL according to example embodiments.
Figure 15:
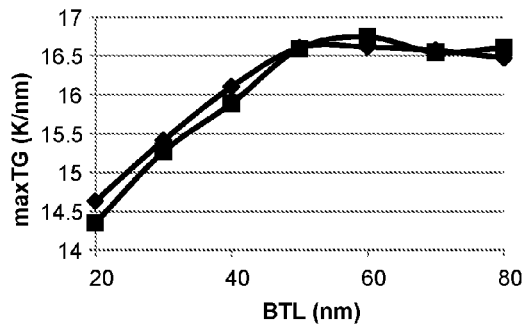
FIG. 15 is a graph showing maximum thermal gradient as a function of BTL according to example embodiments.
Figure 16:
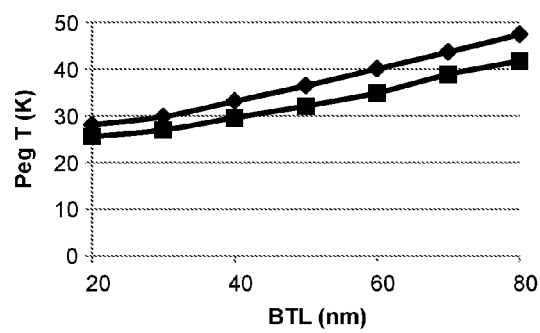
FIG. 16 is a graph showing peg temperature as a function of BTL according to example embodiments.
Figure 17:
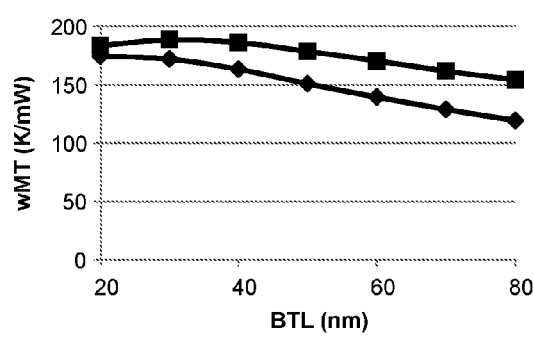
FIG. 17 is a graph showing efficiency as a function of BTL according to example embodiments.
Figure 18:
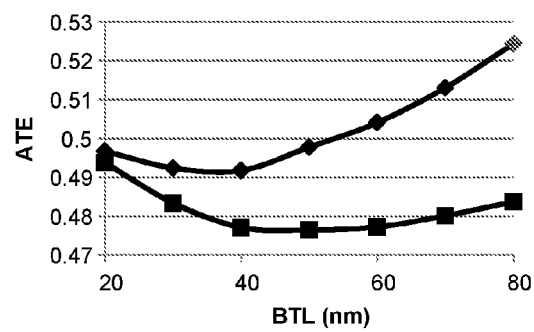
FIG. 18 is a graph showing adjacent track erasure as a function of BTL according to example embodiments.

FIGS. 14-18 are graphs illustrating different NFT performance factors based on the bottom taper length (BTL) in accordance with various embodiments. FIG. 14 shows a graph of down track thermal gradient as a function of BTL, and FIG. 15 shows a graph of maximum thermal gradient as a function of BTL. FIG. 16 is a graph showing peg temperature as a function of BTL. FIG. 17 is a graph showing peg efficiency as a function of BTL, and FIG. 18 is a graph of ATE as a function of BTL. For each of FIGS. 14-18, the BTL was scanned through a range of 20 nm to about 80 nm, while the PTA was 10 nm and the TPH was 80 nm or 120 nm. The graphs of FIGS. 14-18 indicate that good or optimal performance, as shown by down track thermal gradient, efficiency, and adjacent track erasure can be achieved by a BTL of about 40 nm, which corresponds to a 45 degree taper when the PTA is 10 nm. FIG. 14 shows that a TPH of 80 nm has a higher down track thermal gradient and is less sensitive to BTL; however, FIG. 15 shows that maximum thermal gradient for a TPH of both 80 nm and 120 nm is approximately the same. FIG. 16 also indicates that peg temperature rises with increasing BTL.

FIG. 19 is a cross-sectional view of a two-piece NFT design. A two-piece NFT design comprises an enlarged portion and a peg portion formed separately. For example, the peg portion may be formed of different materials from those of the enlarged portion through separate deposition steps. The illustrated portion of NFT 1900 includes an enlarged region 1902, a peg 1908, and a heatsink portion 1906. The peg 1908 includes a peg region 1904 that extends beyond the enlarged region 1902 toward a media-facing surface 108 (in the light-propagating, or z, direction). The peg 1908 terminates at a distal end at or proximate the air bearing surface 108. The peg 1908 is shown to include a tapered portion 1903 facing away from the heatsink portion 1906 and the write pole, not shown, and that reduces the peg dimension for the peg region 1904 in the down track direction. Since the peg 1908 is separate from the enlarged region 1902 in the illustrated two-piece design, the thickness of the peg absent the tapered portion is not necessarily the same as the thickness of the enlarged region 1902 at the media-facing surface. In FIG. 19 the thickness of the peg 1908 is shown as being less than the thickness of the enlarged region 1902 such that the peg 1908 is surrounded by, or encompassed in, the enlarged region 1902.

While the various embodiments described herein are applicable to a variety of NFT designs, including stadium-style (NTS) and lollipop-style (NTL) near-field transducer designs, FIG. 19 illustrates an NFT 1900 having a two-piece NTS design. The heatsink portion 1906 has a sloped planar upper surface and a planar lower surface. The enlarged region 1902 is in contact with the heatsink portion 1906. The heatsink portion 1906 and the enlarged region 1902 each have a first end, both of which terminate proximate the media-facing surface 108 of the slider on which the NFT 1900 is formed. The peg region 1904 extends from the lower portion of the first end of the enlarged region 1902. As shown in FIG. 19, the first end for the respective heatsink portion 1906 and the enlarged region 1902 are recessed at differing distances from the distal end of peg region 1904. The taper 1903 is sized to facilitate a reduction, or confinement, of the thermal spot, thereby reducing thermal background and increasing thermal gradient, by about 25%, when compared to an equivalent NFT that lacks the taper 1903.

The tapered portion 1903 is further illustrated in the perspective view of FIG. 20A showing the enlarged region, peg region, and heatsink portion of an NFT. For a two-piece NFT design, only the peg 1908 is tapered. As shown, the peg 1908 is enclosed in the enlarged portion 1902, with the peg region 1904 protruding therefrom. In addition, the enlarged portion 1902 is not recessed from the media-facing surface between the peg 1908 and heatsink portion 1906. FIG. 4B illustrates various dimensions that can be varied when including a tapered portion for various described embodiments. The peg thickness at the air-bearing surface of the slider (PTA) is delineated as dimension 2010. PTA is measured along the media-facing surface in the down track direction. The taper length, or bottom taper length (BTL), is shown as dimension 2014 and is measured in the light propagating direction. One or more of the PTA 2010, BTL 2014 and the peg thickness 2016 can be varied to adjust the taper angle. Each of these dimensions for a two-piece NFT design can also be varied to modify NFT performance factors.

Figure 21:
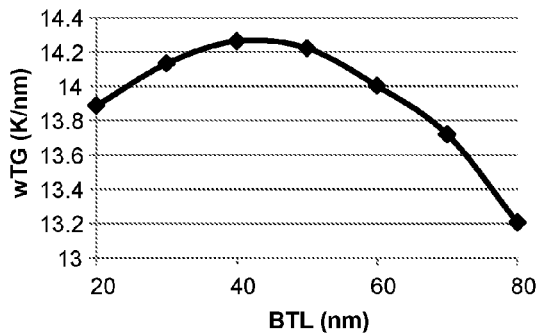
FIG. 21 is a graph showing down track thermal gradient as a function of BTL according to example embodiments.
Figure 22:
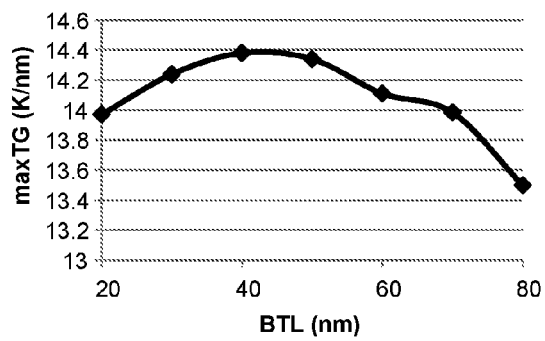
FIG. 22 is a graph showing maximum thermal gradient as a function of BTL according to example embodiments.
Figure 23:
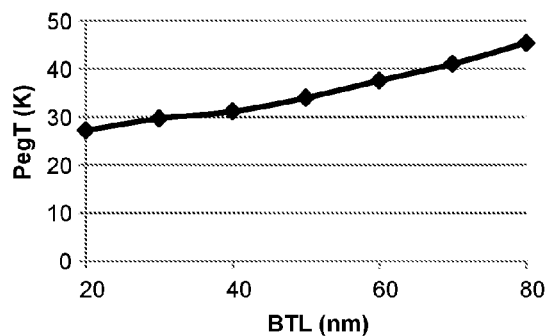
FIG. 23 is a graph showing peg temperature as a function of BTL according to example embodiments.
Figure 24:
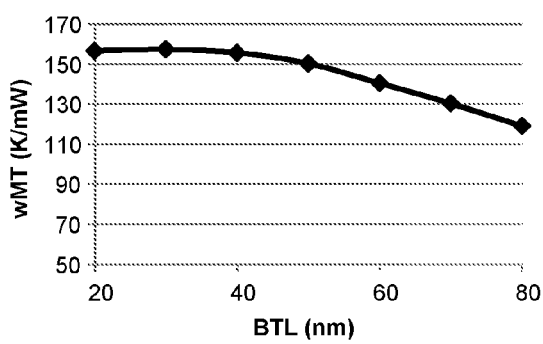
FIG. 24 is a graph showing efficiency as a function of BTL according to example embodiments.
Figure 25:
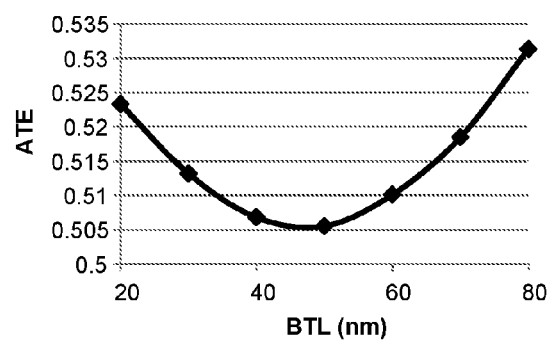
FIG. 25 is a graph showing adjacent track erasure as a function of BTL according to example embodiments.

FIGS. 21-25 are graphs illustrating different NFT performance factors based on the BTL in accordance with various embodiments involving a two-piece NFT design. FIG. 21 shows a graph of down track thermal gradient as a function of BTL, and FIG. 22 shows a graph of maximum thermal gradient as a function of BTL. FIG. 23 is a graph showing peg temperature as a function of BTL. FIG. 24 is a graph showing peg efficiency as a function of BTL, and FIG. 25 is a graph of ATE as a function of BTL. For each of FIGS. 21-25, the BTL was scanned through a range of 20 nm to about 80 nm, while the PTA was 10 nm and the peg thickness was 50 nm. Similar to the data shown in the graphs of FIGS. 14-18, FIGS. 21-25 indicate that good or optimal performance, as shown by down track thermal gradient, efficiency, and adjacent track erasure can be achieved by a BTL of about 40-50 nm. FIG. 21 shows that the down track thermal gradient can reach more than 14 K/nm, which is comparable to the data shown in FIG. 14 for a one-piece design. However, FIG. 22 shows that the maximum thermal gradient is lower than that of a one-piece design (e.g., shown in FIG. 15). Again, FIG. 23 indicates that peg temperature rises with increasing BTL.

Figure 26:
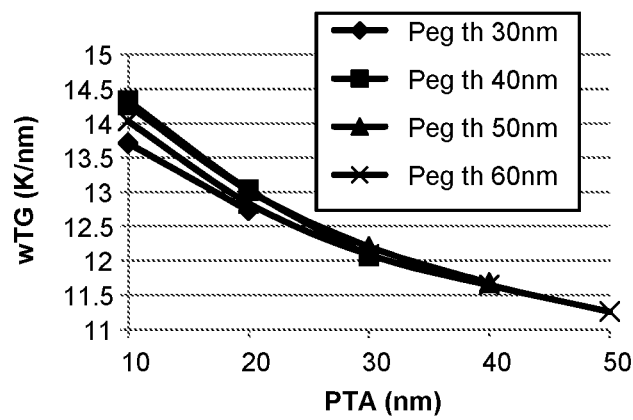
FIG. 26 is a graph showing down track thermal gradient as a function of peg thickness at the air-bearing surface of a slider according to example embodiments.
Figure 27:
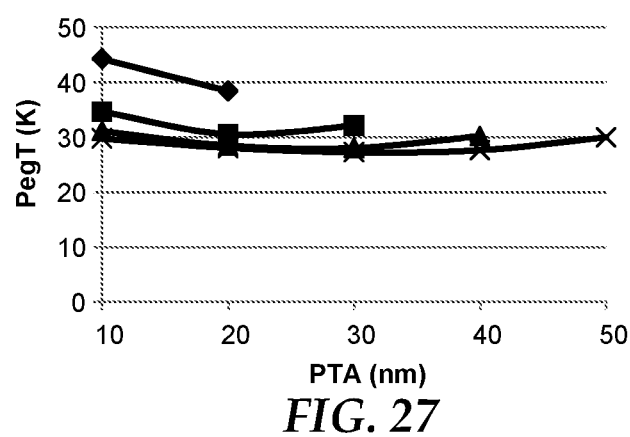
FIG. 27 is a graph showing peg temperature as a function of peg thickness at the air-bearing, surface of a slider according to example embodiments.
Figure 28:
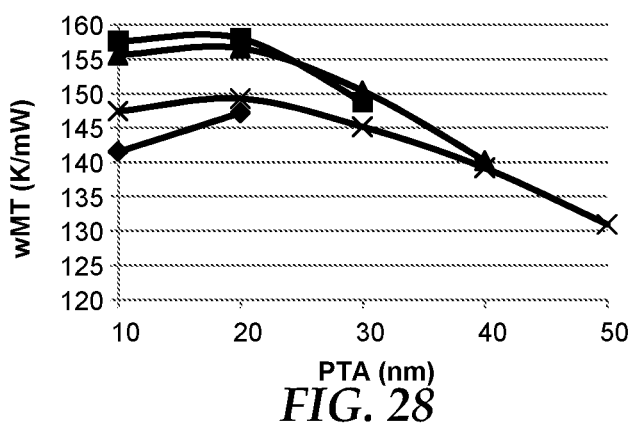
FIG. 28 is a graph showing efficiency as a function of peg thickness at the air-bearing surface of a slider according to example embodiments.

FIGS. 26-28 are graphs illustrating different NFT performance factors based on thickness of the peg region at the air-bearing surface of the slider in accordance with various embodiments. FIG. 26 shows a graph of down track thermal gradient as a function of peg thickness at the ABS. FIG. 27 is a graph showing peg temperature as a function of peg thickness at the ABS, and FIG. 28 is a graph showing peg efficiency as a function of peg thickness at the ABS. For each of FIGS. 26-28, NFTs having respective overall peg thicknesses of 30 nm, 40 nm, 50 nm, and 60 nm, were scanned with peg thicknesses at the ABS of 10 nm, 20 nm, 30 nm, 40 nm, and/or 50 nm. FIG. 26 indicates that good or optimal performance, as shown by down track thermal gradient, can be achieved with an overall peg thickness of about 40-50 nm; however, the 30 nm peg thickness had a slightly lower down track thermal gradient. FIGS. 27 and 28 indicate that peg temperature is higher and efficiency is lower for a peg having an overall thickness of 30 nm. Notably, the data shown in FIGS. 26-28 are for a two-piece design since a thinner peg thickness in a one-piece NFT design results in a significant drop in efficiency and rise in peg temperature.

In addition, the peg width (the dimension of the peg at the air bearing surface measured in the cross-track, or x as shown in FIGS. 3 and 19, direction) can be varied, and the effects of varying the peg width are shown in the chart of FIG. 29. The first two rows compare a peg having a width of 25 nm and a taper with a peg having a width of 25 nm and no taper in a track having a width of 32 nm. The second two rows compare a peg having a width of 35 nm and a taper with a peg having a width of 35 nm and no taper in a track having a width of 39 nm. The last two rows compare a peg having a width of 45 nm and a taper with a peg having a width of 45 nm and no taper in a track having a width of 50 nm. Each of the peg widths indicates an approximate 25% gain in down track thermal gradient. This is true for both one- and two-piece NFT designs including tapers. The last two columns also indicate that for each peg width including a taper, efficiency is higher (indicating a squeezed thermal spot) and peg temperature is lower.

Figure 30:
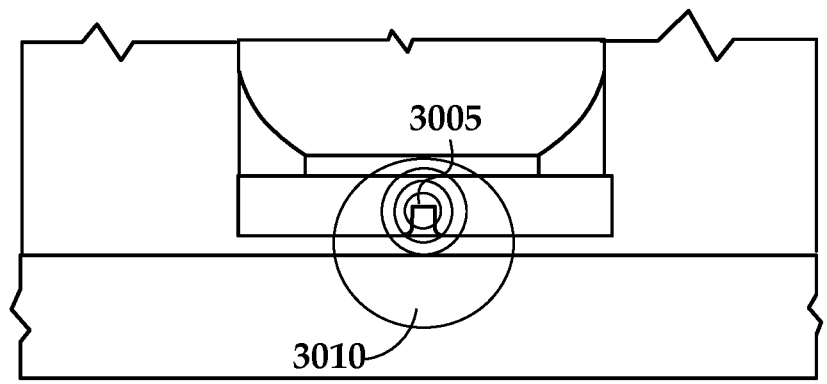
FIG. 30 is a media thermal profile showing a hot spot on a magnetic recording medium produced by an NFT.
Figure 31:
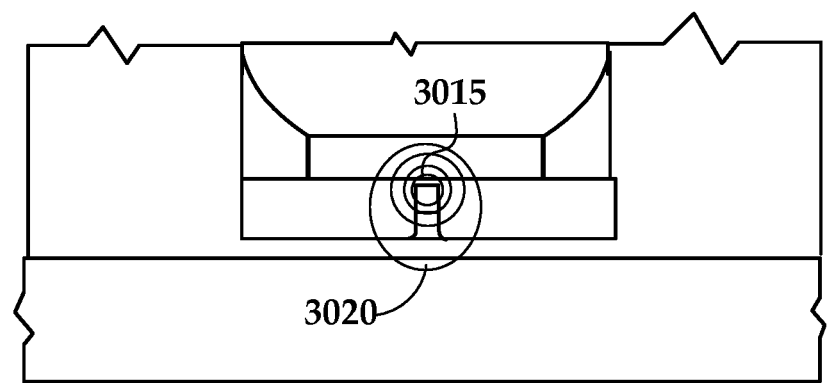
FIG. 31 is a media thermal profile showing a hot spot on a magnetic recording medium produced by an NFT having a two-piece design according to example embodiments.
Figure 32:
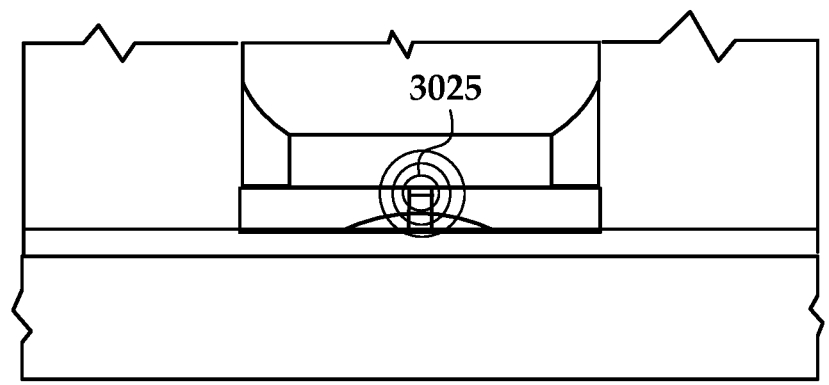
FIG. 32 is a media thermal profile showing a hot spot on a magnetic recording medium produced by an NFT having a one-piece design according to example embodiments.

As discussed above, both one- and two-piece NFT designs including a taper have down track thermal gradients slightly higher than 14 K/nm. Also, the one-piece design including a taper indicated a higher maximum thermal gradient than that of a two-piece design with a taper. This is further illustrated in the media thermal profiles of FIGS. 30-32. FIG. 30 illustrates a thermal spot 3005 on a magnetic recording medium produced by an NFT having a peg width of 25 nm without a taper. The thermal spot 3005 includes a thermal tail 3010. FIG. 31 illustrates a thermal spot 3015 on a magnetic recording medium produced by a two-piece design NFT having a peg width of 25 nm and a taper. The thermal spot 3015 includes a thermal tail 3020. However, the thermal tail 3020 is notably smaller than the thermal tail 3010. FIG. 32 illustrates a thermal spot 3025 on a magnetic recording medium produced by a one-piece design NFT having a peg width of 25 nm and a taper. The thermal spot 3025 does not have a thermal tail due to the tapered enlarged region of the one-piece design. The media thermal profiles of FIGS. 30-32 were produced from computer simulation and demonstrate that the thermal gradient can be greatly improved by inclusion of a taper on the NFT peg region due to a significant reduction in the thermal background at the NPS region of the NFT. Thus, with a tapered NFT design as disclosed the thermal tail can be reduced or completely removed.

Including a taper of the NFT at the air-bearing surface can significantly increase thermal gradient and media heating efficiency and reduce peg temperature. Both one- and two-piece tapered peg designs can achieve a 25% gain in down track thermal gradient, where the down track thermal gradient is about 14.3 K/nm. For example, this gain can be achieved with a peg thickness at the ABS of about 10 nm. In addition, this peg thickness at the ABS can increase heating efficiency 29% due to the confined thermal spot, and adjacent tracking erasure can be reduced from 58% to 47% (~40 deg C. temperature reduction in an adjacent track). Similar gain can be achieved at various peg widths (25 nm, 35 nm, and 45 nm). By further varying additional dimensions, a tapered design can further improve thermal gradient and other performance factors. For example, a one-piece NFT design can have a PTA of 10 nm, a TPH of 80 nm, a BTL of 40 nm, and an overall peg thickness (before the taper) of 50 nm. A one-piece design yields a higher maximum thermal gradient than a two-piece design (16 K/nm vs. 14.4 K/nm). Thus, reducing the NFT peg thickness at the ABS using a taper design improves writability by confining the thermal spot to increase the thermal gradient and heating efficiency while reducing peg temperature.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. An apparatus, comprising:
   a waveguide that delivers energy from an energy source;
   a write pole located proximate the waveguide at a media-facing surface;
   a near-field transducer located proximate the write pole in a down track direction, the near-field transducer comprising:
   an enlarged portion; and
   a peg extending from the enlarged portion towards the media-facing surface, the peg comprising a taper facing away from the write pole, the taper comprising a first end and a second end, where the first end is proximate the media-facing surface at a distal end of the peg and the second end is recessed about 30-200 nm from the pea distal end and causing a reduced down track dimension of the peg near the media-facing surface.

2. The apparatus of claim 1, wherein the peg is made of a different material than the enlarged portion.

3. The apparatus of claim 2, wherein the taper is partially enclosed by t enlarged portion.

4. The apparatus of claim 1, wherein the taper extends through the enlarged portion.

5. The apparatus of claim 1, wherein the peg includes a distal end near the media-facing surface and wherein the near-field transducer further comprises a heatsink portion proximate the enlarged portion, the heatsink portion having a first end proximate the media-facing surface and recessed from the peg distal end.

6. The apparatus of claim 5, wherein the enlarged portion includes a first end proximate the media-facing surface and down track from the peg, the enlarged portion first end being recessed from the peg distal end.

7. The apparatus of claim 1, wherein the down track dimension of the peg near the media-facing surface is in a range of about 10-40 nm.

8. The apparatus of claim 5, wherein the heatsink first end is recessed from the peg distal end by about 50-100 nm.

9. An apparatus, comprising:
a waveguide that delivers energy from an energy source;
a write pole located proximate the waveguide at a media-facing surface;
a near-field transducer located proximate the write pole in a down track direction, the near-field transducer comprising:
an enlarged portion; and
a peg extending from the enlarged portion towards the media-facing surface, the peg and the enlarged portion comprising a taper facing away from the write pole, the taper comprising a first end and a second end, where the first end is proximate the media-facing surface at a distal end of the peg and the second end is recessed about 30-200 nm from the peg distal end and causing a reduced down track dimension of the peg near the media-facing surface.

10. The apparatus of claim 9, wherein the near-field transducer farther comprises a heatsink portion proximate the enlarged portion.

11. The apparatus of claim 10, wherein the peg comprises a distal end near the media-facing surface and the enlarged portion and the heatsink portion are recessed from the peg distal end.

12. The apparatus of claim 9, wherein the down track dimension of the peg near the media-facing surface is in a range of about 10-40 nm.

13. The apparatus of claim 9, wherein the near-field transducer is a stadium-style near-field transducer.

14. The apparatus of claim 9, wherein the near-field transducer is a lollipop-style near-field transducer.

15. An apparatus, comprising:
a waveguide that delivers energy from an energy source;
a write pole located proximate the waveguide at a media-facing surface;
a near-field transducer located proximate the write pole in a down track direction, the near-field transducer comprising:
an enlarged portion comprising a first material; and
a peg comprising a second material and including a peg portion extending from the enlarged portion towards the media-facing surface, the peg portion comprising a taper facing away from the write pole, the taper comprising a first end and a second end, where the first end is proximate the media-facing surface at a distal end of the peg and the second end is recessed about 30-200 nm from the peg distal end and causing a reduced down track dimension of the peg near the media-facing surface.

16. The apparatus of claim 15, wherein the taper is partially enclosed by the enlarged portion.

17. The apparatus of claim 15, wherein the near-field transducer further comprises a heatsink portion proximate the enlarged portion.

18. The apparatus of claim 15, wherein the near-field transducer is a stadium-style near-field transducer.

19. The apparatus of claim 15, wherein the near-field transducer is a lollipop-style near-field transducer.

* * * * *